July 25, 1961 J. W. WOODY, JR 2,994,072

PHOTOELECTRIC CONTROL FOR TAPE POSITIONING

Filed May 4, 1959 2 Sheets-Sheet 1

INVENTOR.

BY James W. Woody, Jr.

Roland A. Anderson

ATTORNEY

INVENTOR.
BY James W. Woody, Jr.
Roland A. Anderson
ATTORNEY

United States Patent Office 2,994,072

Patented July 25, 1961

2,994,072
PHOTOELECTRIC CONTROL FOR TAPE POSITIONING

James W. Woody, Jr., Oak Ridge, Tenn., assignor to the United States of America as represented by the United States Atomic Energy Commission Filed May 4, 1959, Ser. No. 810,974
6 Claims. (Cl. 340—174.1)

The present invention relates to data storage and recovery on magnetic tapes, and more especially to a novel control system for producing control impulses which may be used to start, stop, and position a magnetic tape with respect to a transducer, and to locate discrete areas on the tape as desired.

Information may be stored on magnetic tape in the form of magnetic dipoles. These magnetic dipoles may be induced on magnetic metal or a plastic or paper tape having a magnetic coating thereon by passing the record member under a transducer, or recording head. It is customary to record information in a plurality of parallel tracks for use in parallel digital computers, so that a single "word" (for example, 42 bits) may be stored on a single row across the tape, with succeeding "words" stored in succeeding rows across the narrow dimension of the tape. A multi-channel recording head may then read a complete "word" at one time. Information is recorded in blocks (for example, 128 words) in discrete tape portions, with space left between the blocks on the tape. It is also customary to record a fixed indicium or timing mark for each row to furnish a series of reference points, although this is not required where some bit of each word serves the same purpose.

One problem associated with control of tape storage systems is that of recording, reading, and hunting for data in selected blocks. Another problem is to start and stop the tape without destroying the recorded information thereon by the mechanical action of a clutch or other drive mechanism on the magnetic surface. Another problem is to provide for control of tape positioning, yet allowing movement of the tape in both directions. Still another problem which faces users of magnetic tape is the existence of small imperfect regions in the tape which are not suitable for recording. It is essential that the imperfect regions be skipped over and that no data be recorded thereon.

With a knowledge of the problems associated with the use of magnetic tape for data storage, applicant has devised a novel system which provides positive identification of data blocks, exact positioning of the tape under the magnetic head, drive in either directions, and accurate skip-over of imperfect regions of the tape, and which subjects only those parts of the tape between blocks to the starting and stopping action of the tape drive clutches.

Accordingly it is a principal object of this invention to provide a system for positioning a magnetic record member accurately with respect to a recording transducer, which system allows for movement of the record member in a forward or reverse direction.

Another primary object of this invention is to provide a system of tape markings which cannot be accidentally erased and which are relatively insensitive to damage by the tape driving mechanism.

Yet another object of this invention is to provide a system whereby imperfect regions of the tape may be bypassed completely and automatically during any of the tape operations.

Yet another object of the invention is to provide a system for stopping the tape if equipment malfunction results in a failure to detect the block-identifying signals for each block.

These and other objects and advantages of this invention will become apparent from the following detailed description of a preferred embodiment thereof, when read in connection with the appended drawings, wherein.

While the system to be disclosed is obviously applicable to many different types of tape drive systems, for ease of illustration and by way of example only the system as applied to one particular tape system will be described below. The record member may be a magnetic tape having forty storage channels per word plus two checking channels, the forty-two channels being displaced on a line laterally across the tape. The multi-channel reading-recording head may have forty-two separate transducers so that one row of information may be read simultaneously. The words of data stored may be divided into blocks of 128 words, stored on 128 rows, for example. Physically each block occupies 2.41 inches along the longitudinal dimension of the tape, in a preferred embodiment. The tapes in that embodiment are arranged to move at 47 inches per second, for example. The type of tape transport mechanism used is not important to this invention. The tape may be driven preferably by rollers which are pinched together by clutches, or in any of the many known ways familiar to those working in the art.

*Tape perforations*

Figure 1:
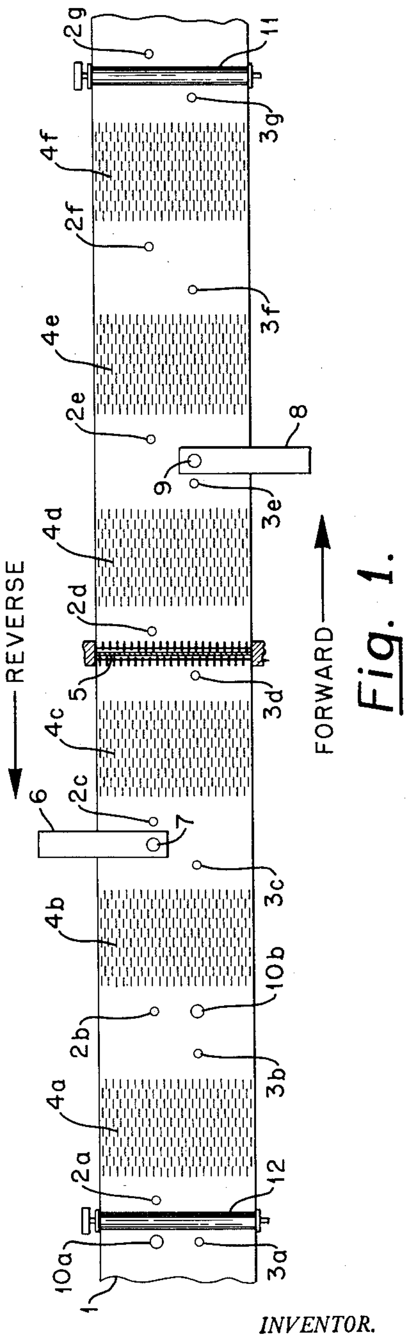
FIG. 1 illustrates a suitable magnetic tape passing under a recording transducer.

Reference to FIG. 1 will indicate special indicia placed upon the tape as a part of this novel system. The tape 1 is provided with two columns of regularly spaced perforations, a pair of perforations being located between each two adjacent blocks of information recorded on the tape. The columns are equally spaced apart from the center line of the tape and the perforations of one column are staggered longitudinally with respect to those of the other column. The shaded areas 4 between the perforations illustrate the words of data arranged in rows perpendicular to the axis of the tape. A conventional reading-writing magnetic head 5 is positioned perpendicular to the longitudinal axis of the tape and parallel to the plane of the tape.

A photo-electric tube 6, referred to hereinafter as the left-hand photo tube (LPT), is positioned a fixed distance from the head 5. A small aperture in the cover for the tube is arranged to register with the apertures of column 2 in the tape. A light source (not shown) is disposed in register with the apertures and adjacent the underneath face of the tape 1. A second photoelectric tube 8, hereinafter referred to as the right-hand photo tube (RPT), is positioned an equal distance from the head 5 in a direction opposite from LPT. A small aperture 9 in the cover of tube 8 registers with the apertures of column 3. Likewise a second light source (not shown) is disposed adjacent the underneath side of tape 1 and in register with the apertures 3. The spacing between the head 5 and the photo tubes 6, 8 is so chosen that when the tape is positioned with apertures 2*d*, 3*d* straddling the head 5, the apertures 2*c*, 3*c* straddle the LPT position and the apertures 2*e*, 3*e* straddle the RPT position.

Tape to be used in this system is scanned for imperfections, and any bad region is plainly marked by punching perforations 10*a*, 10*b* on opposite sides thereof. These perforations are placed one each in columns 2, 3, and in the same row as existing perforations 3*a*, 2*b*. Thus, regardless of the size of the imperfection, an imperfect area is marked off in units of one bad block each by the extra pair of apertures as shown.

*Tape control signals*

A forward clutch roller 11 and a reverse clutch roller 12 are shown positioned two blocks from the respective photo tubes 8, 6. Movement of the tape may be accomplished by clamping these rollers against the tape, one driving in a first direction, the other driving in the opposite direction. Assume for example that the tape is put into forward motion by a signal from an external control which moves roller 11 to force the tape against a constant speed driven roller, thereby accelerating the tape to its normal speed. The roller engages an unrecorded blank section of tape just forward of 4*f*. As the tape moves from left to right, aperture 3*e* comes into register with RPT 8 and its associated light source, thus providing an output or "headlight" signal, signifying the beginning of a cycle. At the end of this signal, when the aperture 3*e* has passed to the right, aperture 3*d* will have cleared transducer 5, the "headlight" signal initiates a timer which subsequently opens a gate to allow signals to enter head 5 to write in the block designated 4*c*.

Writing is accomplished in the conventional manner, i.e., "return-to-zero mode" and automatically erases any information previously stored on the tape. In a preferred conventional manner of operation, an associated word counter counts the pulses from a gated oscillator which is the basic timing device for recording the rows (words) within the block. The information being recorded is so coded that at least two "1's" appear in each row. When the full number 128 of words has been counted, a signal is produced which causes the head to stop writing, but the tape continues to move erasing any old information which may be left in that particular block. The aperture 2*b* then comes into register with LPT 6 and its associated light source, producing an output or "tail light" signal, signifying the end of a block. This signal, together with a block counter, actuates a timer which releases the tape driving mechanism, as will later be described. This may be done by raising the clutch roller from the tape and allowing a vacuum drag or other conventional braking mechanism to stop the tape.

A preset block counter may be set to monitor reading or writing of a selected number of blocks of data. Each "tail light" signal actuates the block counter. If it is desired to continue and record additional blocks of data, the "tail light" signal from LPT 6 serves only to add one count to the block counter. When aperture 3*d* comes into register with the RPT 8, a "headlight" signal is produced which energizes the head 5 to write again in the manner described above. Intermittent operation continues in this manner until the selected number of blocks has been counted. At such time a signal is provided from the output of the preset block counter which will actuate a timer to stop the tape.

Operation of the system for reading information stored on the tape will now be described. Assume that it is desired to read the block 4*c*. The tape drive is started and the tape accelerates to forward speed. When the aperture 3*e* passes under the aperture 9, a signal is produced, the trailing edge of which initiates a timer which causes the head to read as it senses the words stored in the block 4*c*. The words are then counted and at the end of 128 words, the head is de-energized to stop reading. The tape continues to move until a signal is produced by LPT 6 as aperture 2*b* passes aperture 7, and a signal is received from the block counter indicating end of reading. If more than one block is to be read, the signal from LPT 6 serves only to indicate that a block of information has passed and to add one count to the block counter.

It is often necessary to locate or hunt a particular portion of the tape on which data is stored. The operator must select the number of blocks of information which must be traversed from the instant point on the tape to the desired point and energize the forward or reverse drive roller. Block counter circuit 45 is set to the selected number and is connected to receive the "tail light" pulses. It produces a signal at the end of the selected number of pulses, indicating passage of a selected number of blocks. It is obvious that hunting, as well as reading and writing, can be done in either direction because of the symmetry of the photo tubes with respect to the head, merely by energizing one or the other driving device. The output of the block counter for hunting will be a signal to stop the tape drive.

As was above noted, some areas of the tape are marked to indicate imperfections. Means are provided to bypass these sections without counting and without reading therefrom or writing thereon. As the block 4*a* approaches the head 5, aperture 3*c* in passing under RPT 8 would normally energize the recording head. However, at the same time aperture 3*c* is under RPT 8, the additional aperture 10*a* is simultaneously under LPT 6. The coincidence of signals from both photo tubes causes the magnetic head to remain de-energized. After the imperfect block passes under the head, aperture 10*b* comes in to register with RPT 8, producing a signal at the same time as the next aperture in column 2 would come into register with LPT 6. The coincidence of these two signals causes the system to disregard the normal block-ending signal.

*Spacing*

Figure 3:
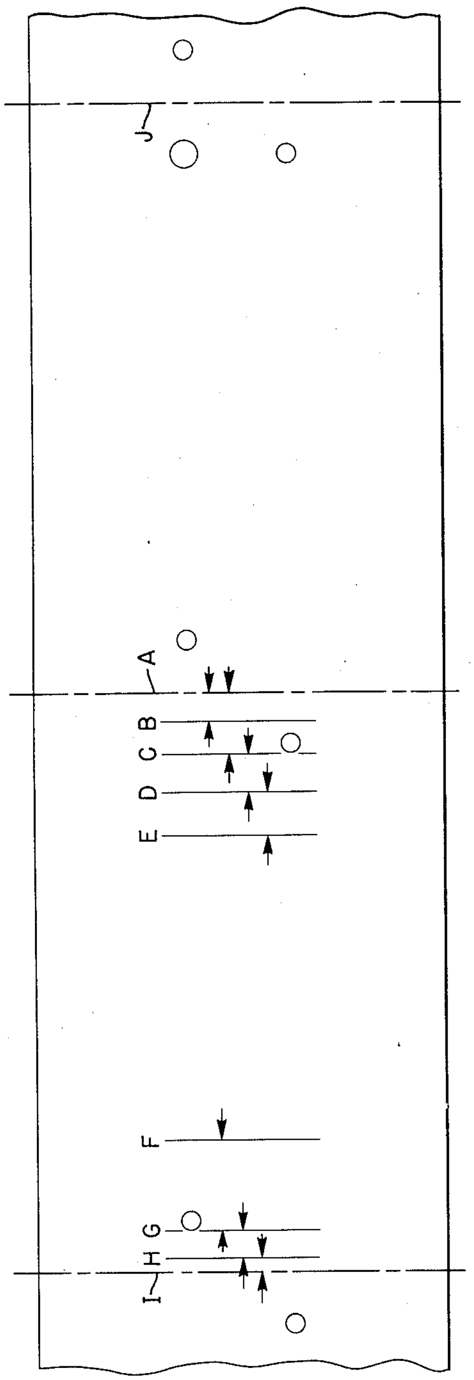
FIG. 3 is a drawing of a section of tape showing the relative distances between certain operating portions of the tape.

Referring now to FIG. 3, the time sequence of the operations will be illustrated as the functions of the dimensions of one specific tape. This information is given purely by way of illustration, in view of the many different characteristics of tape drive mechanisms now available. If the tape drive, starting from rest, takes five milliseconds to achieve its full operating speed of 47 inches per second, the tape will travel about 0.125 inch, which is the distance AB. Approximately 3.4 milliseconds later (distance BC) the trailing edge of aperture 3 will pass under the center of head 5. If the head is to read, the read amplifiers are turned on three milliseconds later as the tape travels the distance CD; if the head is to write, the write amplifiers are turned on 5.96 milliseconds later as the tape travels distance DE. The head then reads or writes, and after 128 words are indicated by the timing marks, the amplifier is turned off. The tape has traveled the distance EF. The time elapsed from the last word until the trailing of aperture 2 passes the center of the head is 7.3 milliseconds and the tape travels distance FG. The timer on the stopping mechanism allows a delay of 3.42 milliseconds before the clutch is disengaged, so that the tape travels the distance GH. Another 2 milliseconds is required for the tape to come to rest, and the tape travels the distance HI. It is obvious that the above timing sequence can be altered to suit any available tape driving and stopping equipment.

*Control circuits*

Figure 2:
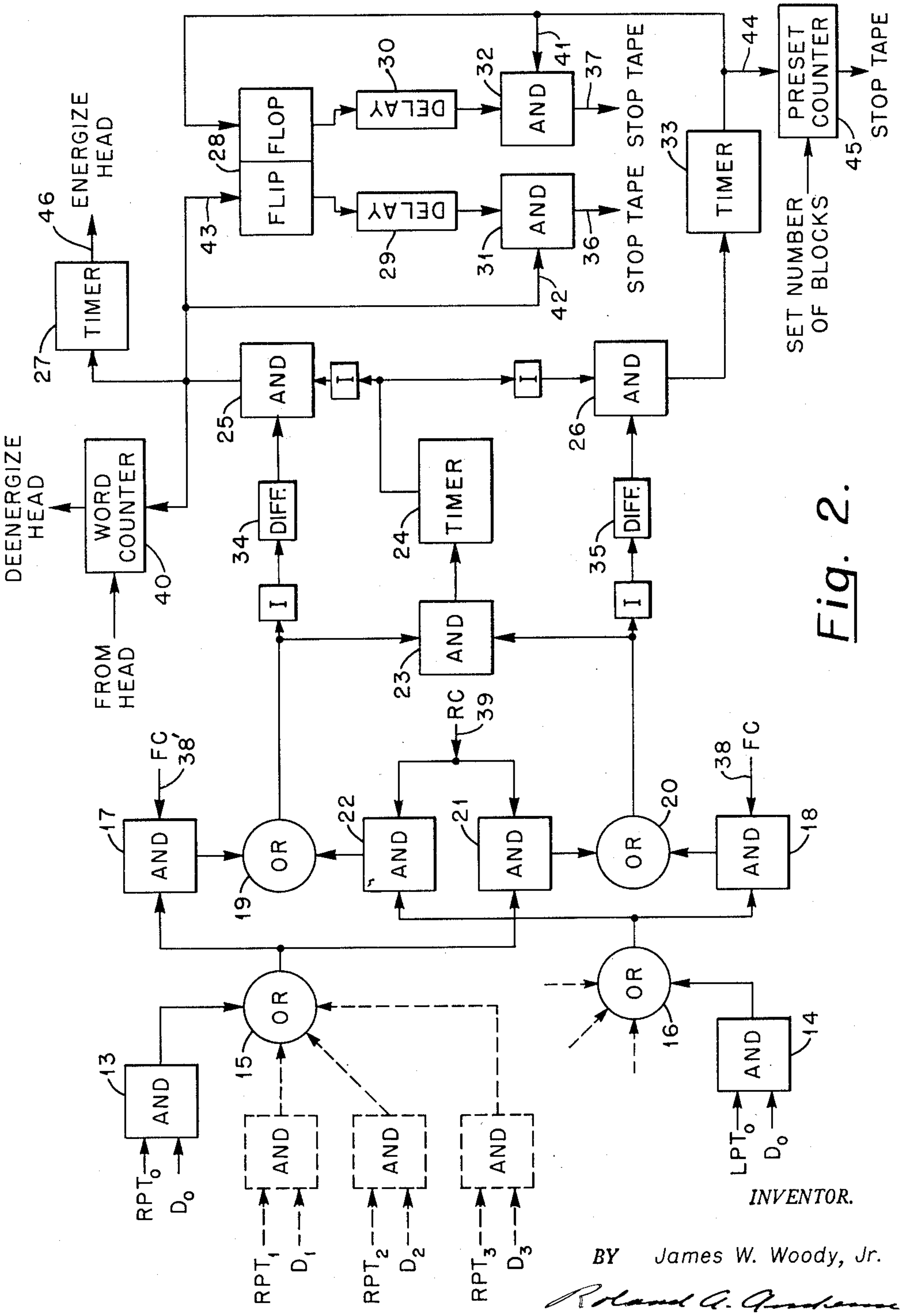
FIG. 2 is a logical diagram of the control system device for the tape driving and recording units.

FIG. 2 illustrates a logical diagram of the control circuits for utilizing the apertures in the tape. In the symbolism used, the "AND" gates and the "OR" gates may be of any conventional design. The "TIMER" may be simply a monostable multivibrator, which will provide two output signals: (1) the unstable state begins when the input signal is received and lasts for a selected interval, producing a first output; (2) the stable state begins at the end of the selected interval after receipt of the input signal, as the device returns to its former condition. The small square marked "DIFF" is a differentiating network for deriving a sharp pulse from the trailing edge of signals applied thereto. A square marked "I" represents an inversion circuit in the conventional manner; that is, an output signal is produced only in the absence of an input signal.

An input signal from RPT 8 is applied to one input of AND gate 13 along with an input $D_0$ which is provided to select any particular tape in a multiple tape installation. The dotted inputs to OR gate 15 are from other AND gates identical to gate 13. One of the AND gates is selected by receipt of an input $D_0$, $D_1$, $D_2$, $D_3$ indicating which tape of the multiple installation is to be used and signals from the respective RPT associated with each tape are received on inputs $RPT_0$, $RPT_1$, $RPT_2$, and $RPT_3$. If both inputs are energized, an output signal from gate 13 is fed through OR gate 15 to the inputs of AND gates 17, 21. A signal from control to drive the tape in the forward direction produces an input signal at the input 38' marked FC (forward clutch). Gate 17 therefore produces an output which is coupled through OR gate 19 to the input of AND gate 23 and the input of differentiator 34. Because of the inversion circuit, there will be no output from differentiator 34, hence no input to AND gate 25. At the end of the signal from RPT 8, however, the input signal to AND gate 13 is removed, terminating the outputs of gates 15, 17, 19, and providing an output signal to the input of gate 25 from circuit 34. In the absence of a second input signal to gate 25 from timer 24, the inversion circuit connected to gate 25 provides the second input which, together with the output from differentiator 34, causes an output signal from gate 25.

This "headlight" signal is fed (1) to an error determining circuit which will be described, (2) to a word counter 40 to energize it to allow it to count the words in that block on the tape, and (3) to timer 27. The signal produced by timer 27 may open gates to the amplifiers in the read-write circuits or otherwise serve to energize the record-read head in a conventional manner. During normal operation, the head is energized by the timing signal from lead 46 and de-energized by the signal from word counter 40 at the end of the selected number of words.

At the end of the block, LPT 6 is energized. As is described above with regard to OR gate 15, gate 16 will receive an input from an AND gate 14. There is an AND gate corresponding to each tape of the multiple installation, as indicated by the dotted lines, and one of them receives a signal D to indicate selection of that particular tape. An output is produced from gate 14 and gate 16. The dotted lines connected to OR gate 16, similarly to those connected to gate 15, indicate inputs from the respective AND gates such as 14 corresponding to each tape of the multiple installation. Selection of the tape to be used actuates the input D to the corresponding AND gate. Gate 18 has its input 38 energized by the signal to drive forward, so an output signal is delivered through gate 20 to the input of circuit 35 and gate 23. At the end of the latter signal to circuit 35, an output is delivered to one input of gate 26. The other input is normally energized and so passes a signal to actuate timer 33. A "block-end" signal is produced, which goes to a preset block counter 45 via lead 44, and to the error circuit.

The counter 45 may be set to any number. After that many counts are accumulated, a stop signal will be generated to stop the tape drive in the conventional manner.

The error determining circuit comprises flipflop 28, delay circuits 29, 30 and a pair of AND gates 31, 32. The output from gate 25 sets the flipflop 28, producing an output which is delayed in circuit 29 until after the input from gate 25 is removed. The output from gate 25 also is applied to a first input to gate 31. The delayed signal is fed to the second input to gate 31 until the flipflop is restored to its other stable state by a signal derived from LPT 6. If the flipflop circuit is not restored to its other state by a signal from LPT 6, the delayed signal, together with the next signal received from gate 25 will produce an output signal from gate 31 on lead 36. This signal, indicating an error in tape operation, is used to stop the tape drive and provide a warning of improper operation. This monitoring circuit prevents errors in tape storage due to failure of a light source or plugging of an aperture 2 in the tape.

A signal from LPT 6 passes through AND gate 14 and OR gate 16 to actuate inputs to AND gates 22, 18. An input from the forward clutch FC to AND gate 18 provides an output through OR gate 20 which is delivered to AND gate 23 and the differentiator circuit 35. Because of the inversion, there will be no output from circuit 35 and therefore no output from AND gate 26. At the end of the signal from LPT 6, however, circuit 35 will produce an output, gate 26 will produce an output, and timer 33 will be actuated. The signal from timer 33 is fed to the other half of flipflop 28 to restore it to its second stable state. Restoration produces an output signal which is delayed in circuit 30 and provided as a first input to AND gate 32. No output is provided therefrom until the next signal from LPT 6 passes through the gates to actuate timer 33 and provide a second input to gate 32 on lead 41. At that time a signal is produced which is used to stop the drive and indicate an error, if flipflop 28 has not been reset by the next signal on lead 43 to remove the signal from delay line 30.

If the tape is being driven in the reverse direction, the signal from the drive mechanism is applied at input RC (reverse clutch) instead of at inputs FC. Gates 21 and 22 then provide signals to the gates 19, 20 in the same manner as did gates 17, 18 for forward operation.

Signals are produced in coincidence at the inputs to the respective phototubes, RPT and LPT only when extra perforations 10*a*, 10*b* are present. When this occurs, signals are delivered at both inputs to AND gate 23, producing an output which actuates timer 24. The signal thus produced is fed to the inversion circuits connected to AND gates 25, 36, thus blocking the signal paths to those gates for the duration of the timer 24 pulse. Therefore the flipflop 28 is not set and the tape continues to move, disregarding the block of data between 10*a* and 10*b*. The block counter 40 is not set, so that space is not counted as a block. The "block-end" signal on lead 44 is not present, so the preset counter 45 is not actuated.

Thus it will be apparent that a novel tape positioning control system has been provided which marks the tape into blocks, counts the blocks, skips over blocks marked to indicate faults, provides signals for turning on and off the recording transducer, and provides for malfunctioning by automatically stopping the tape.

Having described the invention, what is claimed as novel is:

1. In an information storage system comprising an elongated record member adapted to receive rows of recorded information, means for moving said member in forward and reverse directions, and a transducer, improved means for controlling the position of said member with respect to said transducer which comprises: first and second light sources disposed at equal distances *d* from opposite sides of said transducer; first and second light-responsive signal producing devices disposed in spaced relation to and on the opposite sides of the record member from said respective light sources; said record member being provided with a plurality of longitudinally spaced storage areas separated by respective blank areas wherein are located respective first and second apertures, said apertures being both longitudinally and laterally offset to form two columns of longitudinally aligned apertures spaced apart longitudinally by said distance *d* on said record member; means to generate a first control signal in response to actuation of (1) said moving means and (2) only said first light-responsive device for energizing said transducer; means to generate a second control signal in response to actuation of (1) said moving means and (2) only said second light responsive device; and preset counter means connected to receive said second control signal for providing an output signal to de-energize said moving means after receipt of a preset number of output signals.

2. In an information storage system comprising an elongated record member adapted to receive rows of recorded information, means for moving said member in forward and reverse directions, and a transducer, improved means for controlling the position of said member with respect to said transducer which comprises: first and second light sources disposed at equal distances *d* from opposite sides of said transducer; first and second light-responsive signal producing devices disposed in spaced relation to and on the opposite sides of the record member from said respective light sources; said record member being provided with a plurality of longitudinally spaced storage areas separated by respective blank areas wherein are located respective first and second apertures, said apertures being both longitudinally and laterally offset to form two columns of longitudinally aligned apertures spaced apart longitudinally by said distance *d* on said record member; means to generate a first control signal in response to actuation of (1) said moving means and (2) only said first light-responsive device for energizing said transducer; means to generate a second control signal in response to actuation of (1) said moving means and (2) only said second light-responsive device; preset counter means connected to receive said second control signal for providing an output signal to de-energize said moving means after receipt of a preset number of output signals, and checking circuit means for generating an output signal to de-energize said moving means upon receipt of two successive control signals from either of said control signal generating means without receipt of a control signal from the other of said control signal generating means.

3. The device of claim 1 wherein said means to generate a first control signal includes time delay means to delay said first control signal until after one of said first apertures has passed beyond said first light-responsive device.

4. The device of claim 1 wherein said means to generate first and second control signals includes means to inhibit both of said control signals for a selected interval when actuated, and means to actuate said inhibiting means upon simultaneous actuation of said two light-responsive devices.

5. The device of claim 2 wherein said checking circuit means comprises a bistable circuit having first and second inputs and first and second outputs; first and second delay lines connected to respective outputs; first and second AND gates connected to the outputs of said delay lines; means connecting said first input and said first AND gate to receive said first control signal; means connecting said second input and said second AND gate to receive said second control signal, the outputs of said AND gates forming said output signal from said checking circuit means to de-energize said moving means.

6. In a device of the character described, means for generating first and second control pulses upon receipt of first and second input signals from photo-sensitive devices comprising first and second AND gates each having an input connected to receive a signal indicative of forward drive of a record member, third and fourth AND gates each having an input connected to receive a signal indicative of reverse drive of said record member; means connecting said first input signal to a second input of said first and fourth AND gates; means connecting said second input signal to a second input of said third and second AND gates; a first OR gate connected to the output of said first and third AND gates; a second OR gate connected to the output of said second and fourth AND gates; first and second inversion circuits having respective inputs coupled to said first and second OR gates to produce output signals only in the absence of signals from said OR gate outputs; fifth and sixth AND gates each having an input coupled to receive said last named output signals and each having a second input which is energized in the absence of any input signal thereto; a seventh AND gate connected to the outputs of said OR gates; means to generate an output pulse of selected duration connected to be triggered by the output of said seventh AND gate; means coupling said output pulse to said second inputs of said fifth and sixth AND gates to disable the same upon receipt of coincident input signals; and respective pulse-generating means coupled to the outputs of said fifth and sixth AND gates to generate said control pulses.

References Cited in the file of this patent

UNITED STATES PATENTS

| | | |
|---|---|---|
| 2,782,398 | West et al. | Feb. 19, 1957 |
| 2,827,623 | Ainsworth | Mar. 18, 1958 |
| 2,901,730 | Goddard | Aug. 25, 1959 |

OTHER REFERENCES

"Apparatus for Magnetic Storage on Three-Inch Wide Tapes" (Lawrence et al.), Proceedings of the Eastern Joint Computer Conference, December 10–12, 1956, pp. 84–90. New York, N.Y.